(12) United States Patent
Zheng et al.

(10) Patent No.: US 12,384,417 B2
(45) Date of Patent: Aug. 12, 2025

(54) PATH OPTIMIZATION METHOD AND SYSTEM FOR MOBILE ROBOT

(71) Applicant: GUANGDONG POLYTECHNIC NORMAL UNIVERSITY, Guangdong (CN)

(72) Inventors: Zhenxing Zheng, Guangdong (CN); Jian Ouyang, Guangdong (CN); Guifang Ye, Guangdong (CN)

(73) Assignee: GUANGDONG POLYTECHNIC NORMAL UNIVERSITY, Guangzhou (CN)

(*) Notice: Subject to any disclaimer, the term of this patent is extended or adjusted under 35 U.S.C. 154(b) by 132 days.

(21) Appl. No.: 18/545,979

(22) Filed: Dec. 19, 2023

(65) Prior Publication Data
US 2024/0208543 A1    Jun. 27, 2024

(30) Foreign Application Priority Data
Dec. 21, 2022   (CN) .......................... 202211647284.4

(51) Int. Cl.
*B60W 60/00* (2020.01)

(52) U.S. Cl.
CPC .... *B60W 60/0023* (2020.02); *B60W 60/0021* (2020.02)

(58) Field of Classification Search
None
See application file for complete search history.

(56) References Cited

U.S. PATENT DOCUMENTS

| | | | |
|---|---|---|---|
| 10,324,463 B1* | 6/2019 | Konrardy | G01S 19/39 |
| 11,953,903 B2* | 4/2024 | Song | G05D 1/227 |
| 2002/0059213 A1 | 5/2002 | Soga | |
| 2020/0292340 A1 | 9/2020 | Li | |
| 2021/0018916 A1* | 1/2021 | Thakur | G07C 5/08 |
| 2021/0020051 A1 | 1/2021 | Cao et al. | |
| 2023/0063370 A1* | 3/2023 | Li | G05D 1/0289 |

(Continued)

FOREIGN PATENT DOCUMENTS

| | | |
|---|---|---|
| CN | 1350244 A | 5/2002 |
| CN | 106020194 A | 10/2016 |
| CN | 106225788 A | 12/2016 |

(Continued)

OTHER PUBLICATIONS

Yaoyao Fu et al., Research on Path Planning Method of Indoor Mobile Robot based on Improved A-Star Algorithm, Dec. 28, 2022, IEEE, pp. 1-6 (Year: 2022).*

(Continued)

*Primary Examiner* — Justin S Lee
(74) *Attorney, Agent, or Firm* — Pilloff Passino & Cosenza LLP; Rachel Pilloff; Sean Passino

(57) ABSTRACT

A path optimization method for a mobile robot is provided, including: acquiring path information of the mobile robot; processing the path information through a preset path optimization model to obtain path optimization nodes; calculating an optimal path of the mobile robot through the path optimization nodes and feeding the optimal path back to a control terminal; and extracting optimization parameters of the optimal path of the mobile robot, and transmitting the optimization parameters to the preset path optimization model for iterations.

2 Claims, 3 Drawing Sheets

(56) References Cited

U.S. PATENT DOCUMENTS

2023/0236605 A1* 7/2023 Cui .......................... G06T 7/11
701/25

FOREIGN PATENT DOCUMENTS

| | | | |
|---|---|---|---|
| CN | 107464018 A | | 12/2017 |
| CN | 111290431 A | | 6/2020 |
| CN | 113435025 A | | 9/2021 |
| CN | 113985879 A | | 1/2022 |
| CN | 114265364 A | | 4/2022 |
| CN | 115079705 A | | 9/2022 |
| JP | 05101035 A | * | 4/1993 |
| WO | 2019154215 A1 | | 8/2019 |

OTHER PUBLICATIONS

First Office Action for China Application No. 202211647284.4, mailed Feb. 6, 2023.

* cited by examiner

Acquiring path information of the mobile robot

Processing the path information through a preset path optimization model to obtain path optimization nodes Calculating an optimal path of the mobile robot through the path optimization nodes and feeding the optimal path back to a control terminal Extracting optimization parameters of the optimal path of the mobile robot, and transmitting the optimization parameters to the preset path optimization model for iterations

FIG. 1

Receiving and decoding the path information through the preset path optimization model, and determining departure point parameters and destination parameters of the mobile robot Determining mobile position parameters of the mobile robot through the departure point parameters and the destination parameters Obtaining all travel paths of the mobile robot between a departure point and a destination based on the mobile position parameters Selecting the path optimization nodes with path optimization output values in the all travel paths between the departure point and the destination

FIG. 2

Substituting all the path optimization nodes and the travel paths between the path optimization nodes into the path optimization model to calculate travel data Calculating a path optimization weight of each of the travel paths through the travel data Calculating the optimal path of the mobile robot according to the path optimization weight of each of the travel paths between the path optimization nodes and travel data Feeding the optimal path with the path optimization weight and the travel data within preset threshold data back to the control terminal

FIG. 3

Obtaining the optimization parameters of the optimal path of the movable robot and generating optimization data samples Constructing and training the optimization data samples and testing standards for the optimization data samples to generate model information to be optimized Determining optimization indexes through the optimization data samples Transmitting the optimization indexes, the model information to be optimized and the optimization data samples to the path optimization model to match with preset optimization rules, and screening out at least one of the preset optimization rules matched successfully to iterate the path optimization model

FIG. 4

PATH OPTIMIZATION METHOD AND SYSTEM FOR MOBILE ROBOT

CROSS-REFERENCE TO RELATED APPLICATIONS

This application claims priority of Chinese Patent Application No. 202211647284.4, filed on Dec. 21, 2022, the entire contents of which are incorporated herein by reference.

TECHNICAL FIELD

The application relates to the technical field of path optimization, and in particular to a path optimization method and a system for a mobile robot.

BACKGROUND

At present, path optimization, a key technology in enterprise material dispatching and distribution, realizes strategic indicators such as the lowest cost and the shortest transportation duration, and thus improves enterprise benefits. Usually, the path optimization problem may not be solved by polynomial complexity method, but by numerical method. However, in the current path optimization, the deployment number of delivery vehicles is not considered, so it is difficult to plan the paths with actual maps.

SUMMARY

An objective of the present application is to provide a path optimization method and a system for a mobile robot, so as to solve the above problems.

The application provides a path optimization method for a mobile robot, including:
acquiring path information of the mobile robot;
processing the path information through a preset path optimization model to obtain path optimization nodes;
calculating an optimal path of the mobile robot through the path optimization nodes and feeding the optimal path back to a control terminal; and
extracting optimization parameters of the optimal path of the mobile robot, and transmitting the optimization parameters to the preset path optimization model for iterations.

In an embodiment, processing the path information through the preset path optimization model to obtain the path optimization nodes includes:
receiving and decoding the path information through the preset path optimization model, and determining departure point parameters and destination parameters of the mobile robot;
determining mobile position parameters of the mobile robot through the departure point parameters and the destination parameters;
acquiring all travel paths of the mobile robot between a departure point and a destination based on the mobile position parameters; and
selecting the path optimization nodes with path optimization output values in the all travel paths between the departure point and the destination.

In an embodiment, calculating the optimal path of the mobile robot through the path optimization nodes and feeding the optimal path back to the control terminal include:
substituting all the path optimization nodes and the travel paths between the path optimization nodes into the preset path optimization model to calculate travel data, where the travel data at least include travel distances, the travel paths, travel costs and travel durations;
calculating a path optimization weight of each of the travel paths through the travel data;
calculating the optimal path of the mobile robot according to the path optimization weight of each of the travel paths between the path optimization nodes and the travel data; and
feeding the optimal path with the path optimization weight and the travel data within preset threshold data back to the control terminal.

In an embodiment, extracting the optimization parameters of the optimal path of the mobile robot and transmitting the optimization parameters to the preset path optimization model for the iterations include:
acquiring the optimization parameters of the optimal path of the movable robot and generating optimization data samples;
constructing and training the optimization data samples and testing standards for the optimization data samples to generate model information to be optimized;
determining optimization indexes through the optimization data samples; and
transmitting the optimization indexes, the model information to be optimized and the optimization data samples to the preset path optimization model to be matched with preset optimization rules, and screening out at least one of the preset optimization rules matched successfully for the iterations of the preset path optimization model.

In an embodiment, decoding the path information includes as follows.

After calculating the optimal path of the mobile robot through the path optimization nodes, the optimal path data are added with flag bit, then compressed and then fed back to the control terminal; the preset path optimization model receives and decompresses the compressed optimal path data added with flag bit, judges the flag bit, and thereby completes reliable decoding. Specifically, steps include:

S1: after calculating the optimal path of the mobile robot through the path optimization nodes, the optimal path data are added with flag bit and then compressed by the formula (1);

$$\begin{cases} B_{16} = \left\{ \left[ \frac{\left[ \sum_{a=1}^{len(D_{16})} D_{16}(a) \right]_{10}}{len(D_{16})} \right] \%10 \right\}_{16} \\ R_{16} = D_{16} \ll 1 + B_{16} \\ r_{16} = \{R_{16}, 0\}, len(R_{16}) \leq 5 \\ \begin{cases} R1_{16} = R_{16}\{1 \to [len(R_{16}) - 5]\} \\ R2_{10} = (R1_{16})_{10} - \{R_{16}\{[len(R_{16}) - 4] \to len(R_{16})\}\}_{10}, len(R_{16}) > 5 \\ r_{16} = \{R1_{16}, G_{16}, (|R2_{10}|)_{16}, [F(R2_{10})]_{16}, 1\} \end{cases} \end{cases} \quad (1)$$

where $r_{16}$ represents data in hexadecimal form after the optimal path data are added with flag bit and then compressed; $D_{16}$ represents hexadecimal form of original optimal path data; $D_{16}(\alpha)$ represents a numerical value on $\alpha$-th bit in the hexadecimal form of the original optimal path data; len( ) represents solving data bits of the data in brackets; $B_{16}$ represents hexadecimal form of flag bit data; << represents a left shift symbol; {,}, {, , ,} all mean that hexadecimal data separated by commas in brackets are connected end to end to form a new hexadecimal number; % represents mod; ⌈ ⌉ means round up to an integer; ( )₁₀, [ ]₁₀, { }₁₀ all mean to convert numerical values in brackets into decimal numbers; { }₁₆ means to convert numerical values in brackets into hexadecimal numbers; $R_{16}$ represents hexadecimal data after the optimal path data are added with flag bit; $R_{16}\{1 \to [len(R_{16})-5]\}$ means to extract the data from the 1st bit to $len(R_{16})$-5-th bit in the hexadecimal data to obtain new hexadecimal data, recording the new hexadecimal data as $R1_{16}$; $R_{16}\{[len(R_{16})-4] \to len(R_{16})\}$ means to extract the data from $len(R_{16})$-4-th bit to $len(R_{16})$-th bit in the hexadecimal data to obtain new hexadecimal data; $R2_{10}$ represents the decimal form of the compressed optimal path data; | | means to calculate an absolute value; $G_{16}$ represents a preset segmentation character and is used to judge a segmentation position point; F( ) represents sign judgment function, if the numerical value in bracket is greater than or equal to 0, the function value is 1 in hexadecimal form, and if the numerical value in the bracket is less than 0, the function value is 0 in hexadecimal form;

S2: after receiving the compressed optimal path data added with flag bit, the preset path optimization model decompresses the compressed optimal path data added with flag bit by using formula (2), $$\begin{cases} r'_{16} = r_{16} \gg 1, r_{16}[len(r_{16})] = 0 \\ \begin{cases} r1_{16} = r_{16}(G_{16}^+) \\ r2_{16} = [r_{16}(G_{16}^-)]\{1 \to \{len[r_{16}(G_{16}^+)] - 2\}\} \\ r3_{16} = r_{16}[len(r_{16}) - 1] \end{cases}, r_{16}[len(r_{16})] = 1, \\ r'_{16} = \{r1_{16}, (r1_{16})_{10} - [2 \times (r3_{16})_{10} - 1] \times r2_{16} \end{cases} \quad (2)$$

where $r'_{16}$ represents a hexadecimal form after decompressing the compressed optimal path data; $\gg$ means a right shift symbol; $r_{16}[len(r_{16})]$ represents a numerical value at the $len(r_{16})$-th bit in the hexadecimal data $r_{16}$; $r_{16}(G_{16}^+)$ means to find the preset segmentation character $G_{16}$ in the hexadecimal data $r_{16}$, then extract all data on the left of the preset segmentation character and record the data as $r1_{16}$; $r_{16}(G_{16}^-)$ means to extract all data on the right of the preset segmentation character; $[r_{16}(G_{16}^-)]\{1 \to \{len[r_{16}(G_{16}^+)]-2\}\}$ means to extract data from 1st bit to $len[r_{16}(G_{16}^+)]$-2-th bit in the hexadecimal data to obtain new hexadecimal data, recording the new hexadecimal data as $r2_{16}$; $r_{16}[len(r_{16})-1]$ represents a numerical value at $len(r_{16})$-1-th in the hexadecimal data $r_{16}$, recording the numerical value as $r3_{16}$; and S3: after decompressing the compressed optimal path data added with flag bit in S2, the preset path optimization model judges the flag bit of the decompressed data by using a formula (3) to determine whether the decoding is successful or not, and at the same time, whether the path optimization nodes retransmit the optimal path data is controlled according to whether decoding is successful or not, $$F = \begin{cases} 1, r'_{16}[len(r'_{16})] - \left\{ \left[ \frac{\left[\sum_{a=1}^{len(r'_{16}-1)} r'_{16}(a)\right]_{10}}{len(r'_{16}-1)} \right] \%10 \right\}_{16} = 0 \\ 0, r'_{16}[len(r'_{16})] - \left\{ \left[ \frac{\left[\sum_{a=1}^{len(r'_{16}-1)} r'_{16}(a)\right]_{10}}{len(r'_{16}-1)} \right] \%10 \right\}_{16} \neq 0 \end{cases} \quad (3)$$

where F represents a control instruction value of the path optimization nodes for retransmitting the optimal path data;
    if F≠0, the path optimization nodes are controlled to retransmit the optimal path data; and
    if F=0, the path optimization nodes are not controlled to retransmit the optimal path data.

The embodiment has the following effects.

In the S1, the optimal path data are added with flag bit and then compressed by the formula (1), so that the integrity of the data is ensured and the data volume is not too large during data transmission; then, in the S2, the data is decompressed by using the formula (2), and the automatic decompression reflects the characteristics of intelligence and automation of the system; finally, in S3, the flag bit of the decompressed data is judged by the formula (3) to determine whether the decoding is successful or not, and at the same time, whether the path optimization nodes retransmit the optimal path data is controlled according to whether the decoding is successful or not; and further, the path optimization nodes are controlled to retransmit the optimal path data in time if the decoding is unsuccessful, so as to ensure the reliability and stability of the system.

The application provides a path optimization system for a mobile robot, including:
    a path information module, used for acquiring path information of the mobile robot;
    a node selection module, used for processing the path information through a preset path optimization model to obtain path optimization nodes;
    a feedback module, used for calculating an optimal path of the mobile robot through the path optimization nodes and feeding the optimal path back to a control terminal; and
    an optimization iteration module, used for calculating the optimal path of the mobile robot through the path optimization nodes, extracting optimization parameters of the optimal path of the mobile robot, and transmitting the optimization parameters to the preset path optimization model for iterations.

In an embodiment, the node selection module includes:
    a parameter receiving unit, used for receiving and decoding the path information through the preset path optimization model, and determining departure point parameters and destination parameters of the mobile robot;
    a mobile position parameter determining unit, used for determining mobile position parameters of the mobile robot through the departure point parameters and the destination parameters;
    a travel path acquisition unit, used for acquiring all travel paths of the mobile robot between a departure point and a destination based on the mobile position parameters; and
    a path optimization node selection unit, used for selecting the path optimization nodes with path optimization output values in the all travel paths between the departure point and the destination.

In an embodiment, the feedback module includes:
    a travel data calculation unit, used for substituting all the path optimization nodes and the travel paths between the path optimization nodes into the preset path optimization model to calculate travel data,
    where the travel data at least include travel distances, the travel paths, travel costs and travel durations;
    a path optimization weight calculation unit, used for calculating a path optimization weight of each of the travel paths through the travel data;

an optimal path calculation unit, used for calculating the optimal path of the mobile robot through the path optimization weight of each of the travel paths between the path optimization nodes and the traffic data; and a feedback unit, used for feeding the optimal path with the path optimization weight and the travel data within preset threshold data back to the control terminal.

In an embodiment, the optimization iteration module includes:

an optimization data sample unit, used for acquiring the optimization parameters of the optimal path of the mobile robot and generating optimization data samples;

a unit of model information to be optimized, used for constructing and training the optimization data samples and testing standards for the optimization data samples to generate the model information to be optimized;

an optimization index unit, used for determining optimization indexes through the optimization data samples; and an optimization iteration unit, used for transmitting the optimization index, the model information to be optimized and the optimization data samples to the preset path optimization model to match with preset optimization rules, and screening out at least one of the preset optimization rules matched successfully for the iterations of the preset path optimization model.

Other features and advantages of the application are set forth in the following description, and in part is obvious from the description, or is learned by practice of the application. The objective and other advantages of the present application may be realized and obtained by the structure particularly pointed out in the description and the drawings.

The technical scheme of the application is described in further detail through the following drawings and embodiments.

BRIEF DESCRIPTION OF THE DRAWINGS

The drawings are provided to further understand this application and constitute a part of the specification. Together with the embodiments of this application, the drawings are only used to explain this application and are not used to limit the present application.

FIG. 1 is a flowchart of a path optimization method for a mobile robot in an embodiment of the present application.

FIG. 2 is a flowchart of obtaining path optimization nodes in an embodiment of the present application.

FIG. 3 is a flowchart of calculating an optimal path of a mobile robot through path optimization nodes and feeding the optimal path back to a control terminal in an embodiment of the present application.

FIG. 4 is a flowchart of extracting optimization parameters of an optimal path of a mobile robot and transmitting the optimization parameters to a preset path optimization model for iterations in an embodiment of the present application.

DETAILED DESCRIPTION OF THE EMBODIMENTS

Figure 5:
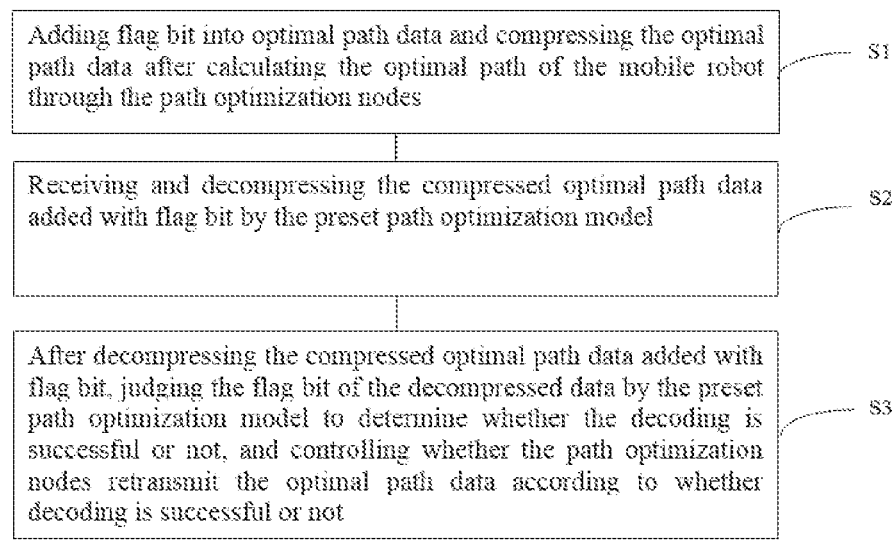
FIG. 5 is a flowchart of decoding path information in an embodiment of the present application.

The embodiments of the present application are described below with reference to the drawings. It should be understood that the embodiments described here are only used to illustrate and explain the present application, and are not used to limit the present application.

It should be noted that when a component is said to be fixed or arranged on another component, the component may be directly or indirectly fixed or arranged on another component. When a component is said to be connected to another component, the component may be directly or indirectly connected to the other component.

In the description of the present application, it should be understood that the orientation or positional relationship indicated by terms "longitudinal", "transverse", "upper", "lower", "front", "rear", "left", "right", "vertical", "horizontal", "top", "bottom", "inner", "outer", etc. is based on the orientation or positional relationship shown in the drawings, and is only for the convenience of describing the present application, rather than indicating or implying that the device or element referred to must have a particular orientation, be constructed and operate in a particular orientation, and therefore should not be understood as limiting the application.

In addition, it should be noted that in the application, relational terms such as first and second are only used to distinguish one entity or operation from another entity or operation, and do not necessarily require or imply that there is any such actual relationship or order between these entities or operations. The meaning of "a plurality of" is two or more, unless there is another explicit limitation. Moreover, the terms "comprising", "including" or any other variation thereof are intended to cover non-exclusive inclusion, so that a process, a method, an article or a device including a series of elements includes not only those elements, but also other elements not explicitly listed or elements inherent to such process, method, article or device.

It is obvious to those skilled in the art that many improvements and changes may be made to the specific embodiments of the specification of the application without departing from the scope or spirit of the application. Other implementation methods obtained from the specification of the application are obvious to the skilled person. The specification and embodiments of the application are only exemplary.

Embodiment 1

As shown in the FIG. 1, the embodiment 1 provides a path optimization method for a mobile robot, including:
acquiring path information of the mobile robot;
processing the path information through a preset path optimization model to obtain path optimization nodes;
calculating an optimal path of the mobile robot through the path optimization nodes and feeding the optimal path back to a control terminal; and
extracting optimization parameters of the optimal path of the mobile robot, and transmitting the optimization parameters to the preset path optimization model for iterations.

The working principle and beneficial effects of the embodiment 1 are as follows.

The embodiment 1 provides a path optimization method for a mobile robot, including: acquiring path information of the mobile robot, so as to acquire an original path of the movable robot; processing the path information through a preset path optimization model to obtain path optimization nodes; calculating an optimal path of the mobile robot through the path optimization nodes and feeding the optimal path back to a control terminal; and extracting optimization parameters of the optimal path of the mobile robot, and transmitting the optimization parameters to the preset path optimization model for iterations, so as to realize the optimization of the deployment number of delivery vehicles and personalize the driving route according to the user's needs by path planning according to the actual map.

Embodiment 2

As shown in FIG. 2, the embodiment 2 relates to processing the path information through the preset path optimization model to obtain the path optimization nodes, including:
receiving and decoding the path information through the preset path optimization model, and determining departure point parameters and destination parameters of the mobile robot;
determining mobile position parameters of the mobile robot through the departure point parameters and the destination parameters;
obtaining all travel paths of the mobile robot between a departure point and a destination based on the mobile position parameters; and
selecting the path optimization nodes with path optimization output values in the all travel paths between the departure point and the destination.

The working principle and beneficial effects of the embodiment 2 are as follows.

The embodiment 2 includes: receiving and decoding the path information through the preset path optimization model, and determining departure point parameters and destination parameters of the mobile robot, which is convenient for path planning; determining mobile position parameters of the mobile robot through the departure point parameters and the destination parameters; obtaining all travel paths of the mobile robot between a departure point and a destination based on the mobile position parameters; and selecting the path optimization nodes with path optimization output values in the all travel paths between the departure point and the destination; the embodiment has the advantages of convenience and high dexterity.

Embodiment 3

As shown in FIG. 3, the embodiment 3 relates to calculating the optimal path of the mobile robot through the path optimization nodes and feeding the optimal path back to the control terminal, including:
substituting all the path optimization nodes and the travel paths between the path optimization nodes into the preset path optimization model to calculate travel data, where the travel data at least include travel distances, the travel paths, travel costs and travel durations;
calculating a path optimization weight of each of the travel paths through the travel data;
according to the path optimization weight of each of the travel paths between the path optimization nodes and travel data, calculating the optimal path of the mobile robot; and
feeding the optimal path with the path optimization weight and the travel data within preset threshold data back to the control terminal.

The working principle and beneficial effects of the embodiment 3 are as follows.

The embodiment 3 includes: substituting all the path optimization nodes and the travel paths between the path optimization nodes into the preset path optimization model to calculate travel data (including travel distances, the travel paths, travel costs, travel durations etc.), so as to improve the path travel efficiency and reduce the travel cost; calculating a path optimization weight of each of the travel paths through the travel data; calculating the optimal path of the mobile robot according to the path optimization weight of each of the travel paths between the path optimization nodes and travel data; and feeding the optimal path with the path optimization weight and the travel data within preset threshold data back to the control terminal, so that the mobile robot has strong adaptability to the path driving.

Embodiment 4

As shown in FIG. 4, the embodiment 4 relates to extracting optimization parameters of the optimal path of the mobile robot and transmitting the optimization parameters to the preset path optimization model for the iterations, including:
obtaining the optimization parameters of the optimal path of the movable robot and generating optimization data samples;
constructing and training the optimization data samples and testing standards for the optimization data samples to generate model information to be optimized; determining optimization indexes through the optimization data samples; and transmitting the optimization indexes, the model information to be optimized and the optimization data samples to the preset path optimization model to match with preset optimization rules, and screening out at least one of the preset optimization rules matched successfully for the iterations of the preset path optimization model.

The working principle and beneficial effects of the embodiment 4 are as follows.

The embodiment 4 includes: obtaining the optimization parameters of the optimal path of the movable robot and generating optimization data samples, so as to improve the accuracy of the optimization model; constructing and training the optimization data samples and testing standards for the optimization data samples to generate model information to be optimized; determining optimization indexes through the optimization data samples; and transmitting the optimization indexes, the model information to be optimized and the optimization data samples to the preset path optimization model to match with preset optimization rules, and screening out at least one of the preset optimization rules matched successfully for the iterations of the preset path optimization model, in which the preset path optimization model is updated by iterations, which makes the preset path optimization model more robust.

In an embodiment, decoding the path information includes as follows.

After calculating the optimal path of the mobile robot through the path optimization nodes, the optimal path data are added with flag bit, then compressed and then fed back to the control terminal; the preset path optimization model receives and decompresses the compressed optimal path data added with flag bit, judges the flag bit, and thereby completes reliable decoding. As shown in FIG. 5, the steps specifically include:
S1: after calculating the optimal path of the mobile robot through the path optimization nodes, the optimal path data are added with flag bit and then compressed by the formula (1);

$$\begin{cases} B_{16} = \left\{ \left[ \dfrac{\left[\sum_{a=1}^{len(D_{16})} D_{16}(a)\right]_{10}}{len(D_{16})} \right] \%10 \right\}_{16} \\ R_{16} = D_{16} \ll 1 + B_{16} \\ \begin{cases} r_{16} = \{R_{16}, 0\}, \; len(R_{16}) \le 5 \\ \begin{cases} R1_{16} = R_{16}\{1 \to [len(R_{16}) - 5]\} \\ R2_{10} = (R1_{16})_{10} - \{R_{16}\{[len(R_{16}) - 4] \to len(R_{16})\}\}_{10}, \; len(R_{16}) > 5 \\ r_{16} = \{R1_{16}, G_{16}, (|R2_{10}|)_{16}, [F(R2_{10})]_{16}, 1\} \end{cases} \end{cases} \end{cases}$$ (1)

where $r_{16}$ represents data in hexadecimal form after the optimal path data are added with flag bit and then compressed; $D_{16}$ represents hexadecimal form of original optimal path data; $D_{16}(\alpha)$ represents a numerical value on $\alpha$-th bit in the hexadecimal form of the original optimal path data; len( ) represents solving data bits of the data in brackets; $B_{16}$ represents hexadecimal form of flag bit data; << represents a left shift symbol; {,}, {, , ,} all mean that hexadecimal data separated by commas in brackets are connected end to end to form a new hexadecimal number; % represents mod; ⌈ ⌉ means round up to an integer; ( )$_{10}$, [ ]$_{10}$, { }$_{10}$ all mean to convert numerical values in brackets into decimal numbers; { }$_{16}$ means to convert numerical values in brackets into hexadecimal numbers; $R_{16}$ represents hexadecimal data after the optimal path data are added with flag bit; $R_{16}\{1 \to [len(R_{16})-5]\}$ means to extract the data from the 1st bit to $len(R_{16})$-5-th bit in the hexadecimal data to obtain new hexadecimal data, recording the new hexadecimal data as $R1_{16}$; $R_{16}\{[len(R_{16})-4] \to len(R_{16})\}$ means to extract the data from $len(R_{16})$-4-th bit to $len(R_{16})$-th bit in the hexadecimal data to obtain new hexadecimal data; $R2_{10}$ represents the decimal form of the compressed optimal path data; | | means to calculate an absolute value; $G_{16}$ represents a preset segmentation character and is used to judge a segmentation position point; F( ) represents sign judgment function, if the numerical value in bracket is greater than or equal to 0, the function value is 1 in hexadecimal form, and if the numerical value in the bracket is less than 0, the function value is 0 in hexadecimal form;

S2: after receiving the compressed optimal path data added with flag bit, the preset path optimization model decompresses the compressed optimal path data added with flag bit by using formula (2), $$\begin{cases} r'_{16} = r_{16} \gg 1, \; r_{16}[len(r_{16})] = 0 \\ \begin{cases} r1_{16} = r_{16}(G_{16}^-) \\ r2_{16} = [r_{16}(G_{16}^-)]\{1 \to \{len[r_{16}(G_{16}^+)] - 2\}\} \; , r_{16}[len(r_{16})] = 1, \\ r3_{16} = r_{16}[len(r_{16}) - 1] \end{cases} \\ r'_{16} = \{r1_{16}, (r1_{16})_{10} - [2 \times (r3_{16})_{10} - 1] \times r2_{16} \end{cases}$$ (2)

where $r'_{16}$ represents a hexadecimal form after decompressing the compressed optimal path data; >> means a right shift symbol; $r_{16}[len(r_{16})]$ represents a numerical value at the $len(r_{16})$-th bit in the hexadecimal data $r_{16}$; $r_{16}(G_{16}^+)$ means to find the preset segmentation character $G_{16}$ in the hexadecimal data $r_{16}$, then extract all data on the left of the preset segmentation character and record the data as $r1_{16}$; $r_{16}(G_{16}^-)$ means to extract all data on the right of the preset segmentation character; $[r_{16}(G_{16}^-)]\{1 \to \{len[r_{16}(G_{16}^+)]-2\}\}$ means to extract data from 1st bit to $len[r_{16}(G_{16}^+)]$-2-th bit in the hexadecimal data to obtain new hexadecimal data, recording the new hexadecimal data as $r2_{16}$; $r_{16}[len(r_{16})-1]$ represents a numerical value at $len(r_{16})$-1-th in the hexadecimal data $r_{16}$, recording the numerical value as $r3_{16}$; and S3: after decompressing the compressed optimal path data added with flag bit in S2, the preset path optimization model judges the flag bit of the decompressed data by using a formula (3) to determine whether the decoding is successful or not, and at the same time, whether the path optimization nodes retransmit the optimal path data is controlled according to whether decoding is successful or not, $$F = \begin{cases} 1, \; r'_{16}[len(r'_{16})] - \left\{ \left[ \dfrac{\left[\sum_{a=1}^{len(r'_{16}-1)} r'_{16}(a)\right]_{10}}{len(r'_{16}-1)} \right] \%10 \right\}_{16} = 0 \\ 0, \; r'_{16}[len(r'_{16})] - \left\{ \left[ \dfrac{\left[\sum_{a=1}^{len(r'_{16}-1)} r'_{16}(a)\right]_{10}}{len(r'_{16}-1)} \right] \%10 \right\}_{16} \ne 0 \end{cases}$$ (3)

where F represents a control instruction value of the path optimization nodes for retransmitting the optimal path data;

if F≠0, the path optimization nodes are controlled to retransmit the optimal path data; and if F=0, the path optimization nodes are not controlled to retransmit the optimal path data.

The embodiment has the following effects.

In the S1, the optimal path data are added with flag bit and then compressed by the formula (1), so that the integrity of the data is ensured and the data volume is not too large during data transmission; then, in the S2, the data is decompressed by using the formula (2), and the automatic decompression reflects the characteristics of intelligence and automation of the system; finally, in S3, the flag bit of the decompressed data is judged by the formula (3) to determine whether the decoding is successful or not, and at the same time, whether the path optimization nodes retransmit the optimal path data is controlled according to whether the decoding is successful or not; and further, the path optimization nodes are controlled to retransmit the optimal path data in time if the decoding is unsuccessful, so as to ensure the reliability and stability of the system.

Embodiment 5

The embodiment 5 provides a path optimization system for a mobile robot, including:

a path information module, used for acquiring path information of the mobile robot;

a node selection module, used for processing the path information through a preset path optimization model to obtain path optimization nodes;

a feedback module, used for calculating an optimal path of the mobile robot through the path optimization nodes and feeding the optimal path back to a control terminal; and an optimization iteration module, used for calculating the optimal path of the mobile robot through the path optimization nodes, extracting optimization parameters of the optimal path of the mobile robot, and transmitting the optimization parameters to the preset path optimization model for iterations.

Embodiment 6

The node selection module includes:
a parameter receiving unit, used for receiving and decoding the path information through the preset path optimization model, and determining departure point parameters and destination parameters of the mobile robot;
a mobile position parameter determining unit, used for determining mobile position parameters of the mobile robot through the departure point parameters and the destination parameters;
a travel path acquisition unit, used for acquiring all travel paths of the mobile robot between a departure point and a destination based on the mobile position parameters; and
a path optimization node selection unit, used for selecting the path optimization nodes with path optimization output values in the all travel paths between the departure point and the destination.

Embodiment 7

The feedback module includes:
a travel data calculation unit, used for substituting all the path optimization nodes and the travel paths between the path optimization nodes into the preset path optimization model to calculate travel data,
where the travel data at least include travel distances, the travel paths, travel costs and travel durations;
a path optimization weight calculation unit, used for calculating a path optimization weight of each of the travel paths through the travel data;
an optimal path calculation unit, used for calculating the optimal path of the mobile robot through the path optimization weight of each of the travel paths between the path optimization nodes and the traffic data; and
a feedback unit, used for feeding the optimal path with the path optimization weight and the travel data within preset threshold data back to the control terminal.

Embodiment 8

The optimization iteration module includes:
an optimization data sample unit, used for acquiring the optimization parameters of the optimal path of the mobile robot and generating optimization data samples;
a unit of model information to be optimized, used for constructing and training the optimization data samples and testing standards for the optimization data samples to generate the model information to be optimized;
an optimization index unit, used for determining optimization indexes through the optimization data samples; and
an optimization iteration unit, used for transmitting the optimization index, the model information to be optimized and the optimization data samples to the preset path optimization model to match with preset optimization rules, and screening out at least one of the preset optimization rules matched successfully for the iterations of the preset path optimization model.

It should be understood by those skilled in the art that embodiments of the present application may be provided as a method, a system, or a computer program product. Therefore, the application may take a form of an entirely hardware embodiment, an entirely software embodiment, or an embodiment combining software and hardware. Moreover, the application may take the form of a computer program product implemented on one or more computer-usable storage media (including but not limited to magnetic disk storage and optical storage) containing computer-usable program codes.

The present application is described with reference to a method, a device (system), and a flowchart and/or block diagram of computer program products according to embodiments of the present application. It should be understood that each of processes and/or blocks in the flowchart and/or block diagram, and combinations of the processes and/or the blocks in the flowchart and/or block diagram may be implemented by computer program instructions. These computer program instructions may be provided to a processor of a general-purpose computer, a special-purpose computer, an embedded processor or other programmable data processing apparatus to produce a machine, such that the instructions, executed by the processor of the computer or other programmable data processing apparatus, produce means for implementing the functions specified in one or more flow charts and/or block diagrams.

These computer program instructions may also be stored in a computer-readable memory that may direct a computer or other programmable data processing apparatus to operate in a particular manner, such that the instructions stored in the computer-readable memory produce an article of manufacture including a command device. The command device implements the functions specified in one or more processes in flow charts and/or in one or more blocks in block diagrams.

It should be understood that the technical schemes of the present application are not limited to the above specific embodiments, and any technical variations made according to the technical solutions of the present application, without departing from the protection scope defined by claims of the present application, shall fall within the scope of protection of the present application.

What is claimed is:
1. A path optimization method for a mobile robot, comprising:
acquiring path information of the mobile robot;
processing the path information through a preset path optimization model to obtain path optimization nodes;
calculating an optimal path of the mobile robot through the path optimization nodes and feeding the optimal path back to a control terminal; and
extracting optimization parameters of the optimal path of the mobile robot, and transmitting the optimization parameters to the preset path optimization model for iterations;
wherein processing the path information through the preset path optimization model to obtain the path optimization nodes comprises:
receiving and decoding the path information through the preset path optimization model, and determining departure point parameters and destination parameters of the mobile robot;
determining mobile position parameters of the mobile robot through the departure point parameters and the destination parameters;
acquiring all travel paths of the mobile robot between a departure point and a destination based on the mobile position parameters; and
selecting the path optimization nodes with path optimization output values in the all travel paths between the departure point and the destination;

wherein calculating the optimal path of the mobile robot through the path optimization nodes and feeding the optimal path back to the control terminal comprise:

substituting all the path optimization nodes and the travel paths between the path optimization nodes into the preset path optimization model to calculate travel data, wherein the travel data at least comprise travel distances, the travel paths, travel costs and travel durations;

calculating a path optimization weight of each of the travel paths through the travel data;

calculating the optimal path of the mobile robot according to the path optimization weight of each of the travel paths between the path optimization nodes and the travel data; and feeding the optimal path with the path optimization weight and the travel data within preset threshold data back to the control terminal;

wherein extracting the optimization parameters of the optimal path of the mobile robot and transmitting the optimization parameters to the preset path optimization model for the iterations comprise:

acquiring the optimization parameters of the optimal path of the mobile robot and generating optimization data samples;

constructing and training the optimization data samples and testing standards for the optimization data samples to generate model information to be optimized;

determining optimization indexes through the optimization data samples; and transmitting the optimization indexes, the model information to be optimized and the optimization data samples to the preset path optimization model to be matched with preset optimization rules, and screening out at least one of the preset optimization rules matched successfully for the iterations of the preset path optimization model.

2. A path optimization system for a mobile robot, comprising:

a path information module, used for acquiring path information of the mobile robot;

a node selection module, used for processing the path information through a preset path optimization model to obtain path optimization nodes;

a feedback module, used for calculating an optimal path of the mobile robot through the path optimization nodes and feeding the optimal path back to a control terminal; and an optimization iteration module, used for calculating the optimal path of the mobile robot through the path optimization nodes, extracting optimization parameters of the optimal path of the mobile robot, and transmitting the optimization parameters to the preset path optimization model for iterations;

wherein the node selection module comprises:

a parameter receiving unit, used for receiving and decoding the path information through the preset path optimization model, and determining departure point parameters and destination parameters of the mobile robot;

a mobile position parameter determining unit, used for determining mobile position parameters of the mobile robot through the departure point parameters and the destination parameters;

a travel path acquisition unit, used for acquiring all travel paths of the mobile robot between a departure point and a destination based on the mobile position parameters; and a path optimization node selection unit, used for selecting the path optimization nodes with path optimization output values in the all travel paths between the departure point and the destination;

wherein the feedback module comprises:

a travel data calculation unit, used for substituting all the path optimization nodes and the travel paths between the path optimization nodes into the preset path optimization model to calculate travel data, wherein the travel data at least comprise travel distances, the travel paths, travel costs and travel durations;

a path optimization weight calculation unit, used for calculating a path optimization weight of each of the travel paths through the travel data;

an optimal path calculation unit, used for calculating the optimal path of the mobile robot through the path optimization weight of each of the travel paths between the path optimization nodes and the travel data; and a feedback unit, used for feeding the optimal path with the path optimization weight and the travel data within preset threshold data back to the control terminal;

wherein the optimization iteration module comprises:

an optimization data sample unit, used for acquiring the optimization parameters of the optimal path of the mobile robot and generating optimization data samples;

a unit of model information to be optimized, used for constructing and training the optimization data samples and testing standards for the optimization data samples to generate the model information to be optimized;

an optimization index unit, used for determining optimization indexes through the optimization data samples; and an optimization iteration unit, used for transmitting the optimization indexes, the model information to be optimized and the optimization data samples to the preset path optimization model to be matched with preset optimization rules, and screening out at least one of the preset optimization rules matched successfully for the iterations of the preset path optimization model.

* * * * *